July 7, 1959 J. KLINK 2,893,129
GAGE HAVING A SERIES OF REEDS TO SUPPORT THE MOVABLE CONTACT
Filed Dec. 5, 1956 2 Sheets-Sheet 1
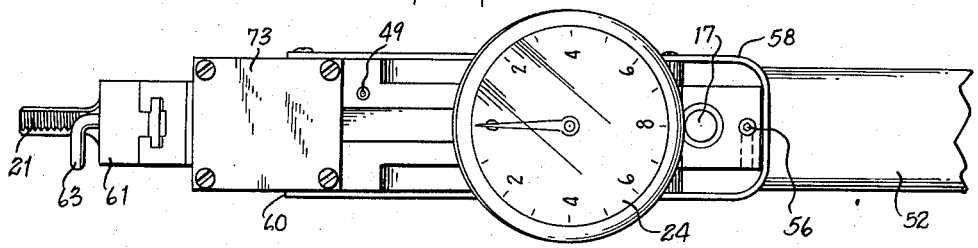
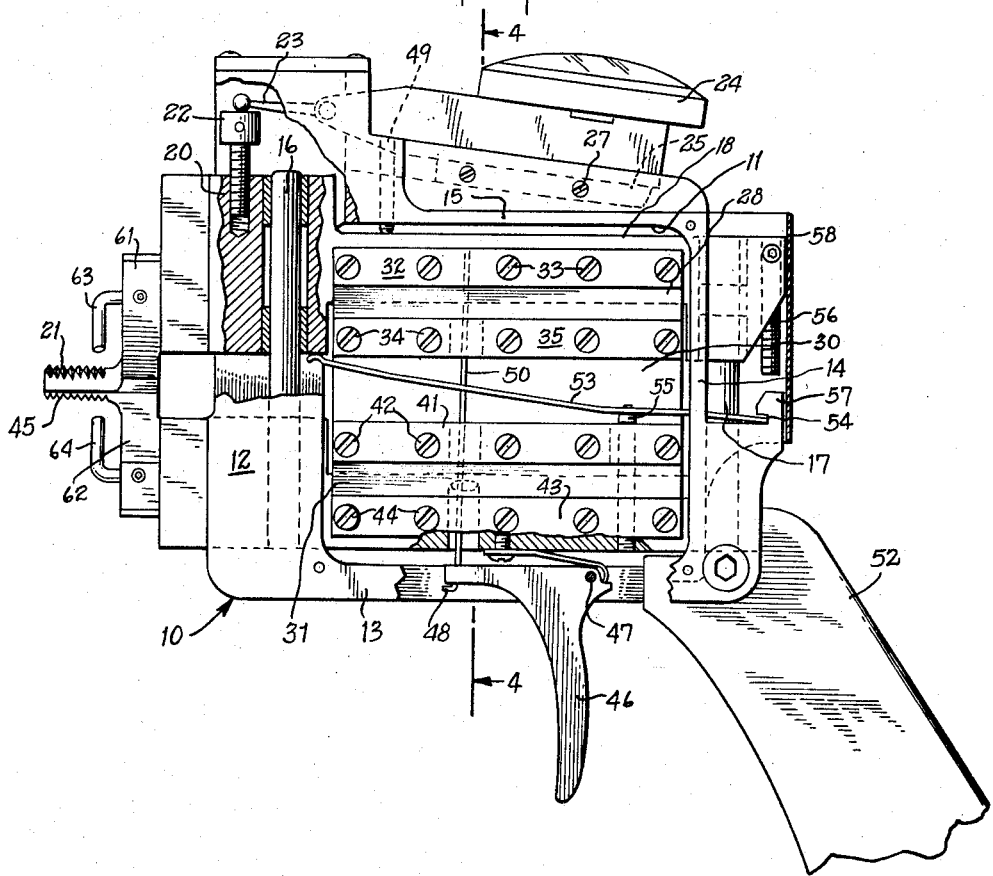
INVENTOR.
JOHN KLINK
BY
Darby & Darby
ATTORNEYS July 7, 1959 J. KLINK 2,893,129
GAGE HAVING A SERIES OF REEDS TO SUPPORT THE MOVABLE CONTACT
Filed Dec. 5, 1956 2 Sheets-Sheet 2
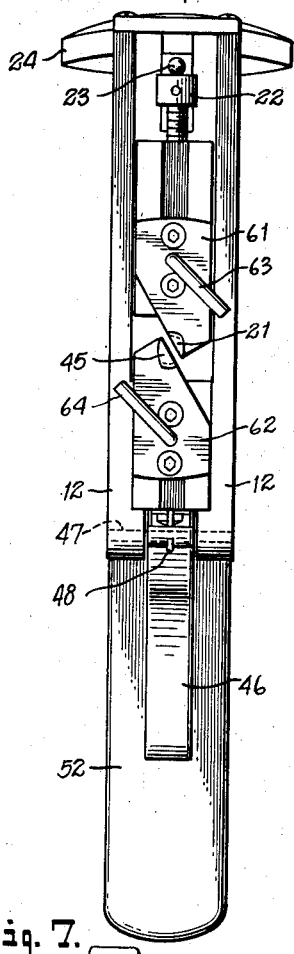
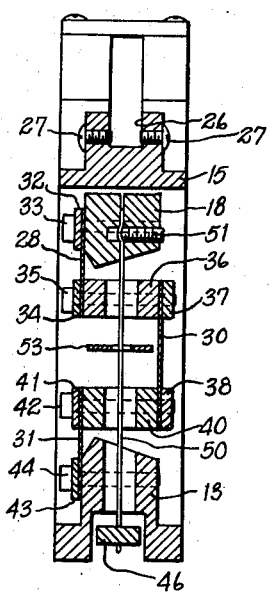
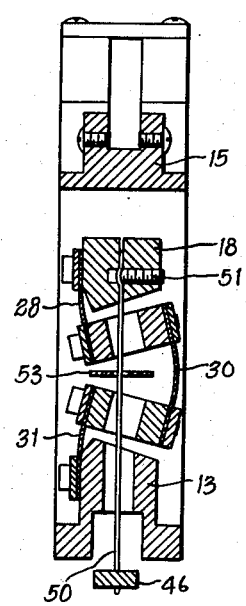
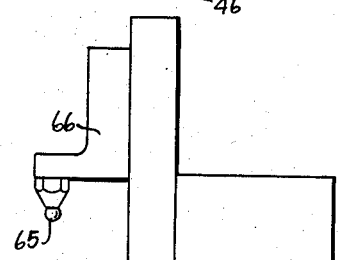
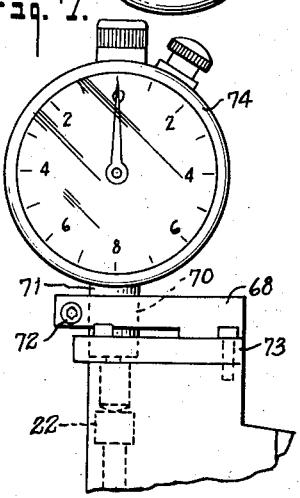
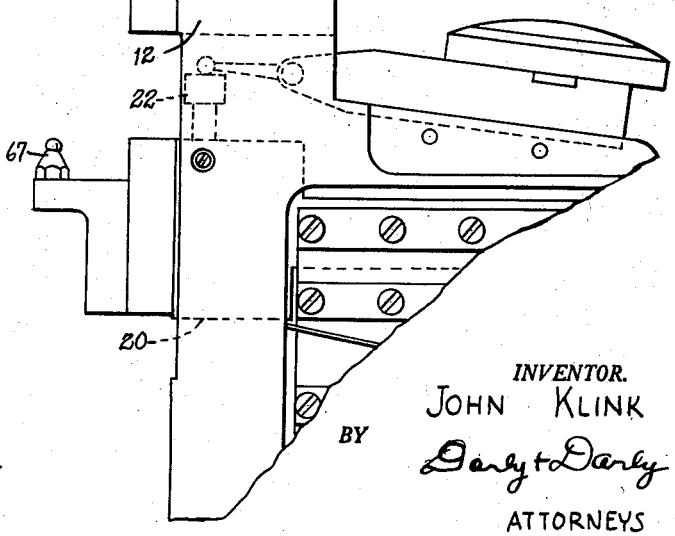
INVENTOR.
JOHN KLINK
BY
ATTORNEYS

United States Patent Office 2,893,129
Patented July 7, 1959

2,893,129

GAGE HAVING A SERIES OF REEDS TO SUPPORT THE MOVABLE CONTACT

John Klink, Pine Plains, N.Y., assignor to Standard Gage Company, Inc., Poughkeepsie, N.Y., a corporation of New York Application December 5, 1956, Serial No. 626,396

10 Claims. (Cl. 33—147)

The present invention relates to linear gages utilized for measuring linear dimensions such as thread pitch diameter, groove diameter, bore diameter, etc.

More particularly still the invention relates to a gage in which the movable measuring member or contact is supported by reeds fixed to the frame of the instrument and thus movable with respect to a contact fixed to the frame of the instrument. In the past gages having reeds therein were so constructed that the reeds were fixed at one end and movable at the opposite end due to flexion of the reed. In an instrument thus constructed, if a considerable range of movement were to be obtained, it was necessary that the reeds be relatively long. The result of this length was that the movable measuring contact traversed a circle arc. Therefore, the measurement was not accurate at all points in the range. The only alternative to the inaccuracy was to limit the range of the instrument and to attempt measurement only when the reeds were in a substantially unflexed condition.

The instrument of the present invention utilizes reeds which, instead of being flexed along their length, bend longitudinally, the reeds being so arranged that the movement of the measuring element supported thereby is substantially in a straight line whereby the range of the instrument may be increased without at the same time causing movement through an arcuate path and thus introducing error into the reading.

With the reed arrangement of the present invention it is furthermore possible to procure such straight line movement even though the point of gaging application is considerably removed from the guide members associated with the movable elements.

It is an object of this invention to provide a gage having a reed type suspension to thus procure parallel movement of the movable gaging element throughout the range of gaging movement.

It is another object of the invention to provide a reed type gage wherein the gaging movement is in a plane parallel to the flat sides of the reeds rather than transverse to those flat sides.

It is another object of the invention to provide a dial indicator gage in which the range of retraction is great as compared with the common reed suspension.

It is a still further object of the invention to provide a reed type gage which is more compact while providing the same "reach" and range of action as can be secured with the bulky type of gage necessitated by the older reed suspension methods.

Other objects and features of the invention will be apparent when the following description is considered in connection with the annexed drawings, in which, Figure 1 is a top plan view of a particular embodiment of my invention wherein the gaging contacts are adapted to measure the pitch diameter of internally threaded members. Other anvils or gaging contacts may be substituted for the thread gaging members to adapt the gage to the gaging of bores, grooves, etc., and further by a slight rearrangement of the parts the gage may be used for gaging exterior rather than interior dimensions;

Figure 2 is a side elevational view of the gage of Figure 1, portions being broken away to indicate the internal construction more clearly;

Figure 3 is an end elevational view of the gage of Figure 1 and 2 taken from the left end of the gage as seen in Figures 1 and 2;

Figure 4 is a vertical cross-sectional view of the gage of the preceding figures, the view being taken on the plane of the line 4—4 of Figure 2. In this view the parts are shown in the position which they occupy when the gaging contacts are fully separated;

Figure 5 is a view similar to that of Figure 4, but showing the parts in the position which they occupy when the movable contact has been moved toward the fixed contact in order to insert these gaging contacts within a threaded bore;

Figure 6 is a fragmentary elevational view showing one manner of modifying the structure of the preceding figures to adapt it for external gaging; and Figure 7 is a fragmentary view of a portion of the gage frame showing particularly the mode of mounting a different type of dial indicator in the frame. This arrangement of indicator makes it possible to view the dial from and desired direction and is preferable in some instances to the use of the indicator shown in the preceding figures which must be viewed from the top only.

Referring now to the drawings, and particularly to Figures 1 through 5, the gage comprises a frame 10 which, as is shown in Figure 1, is generally rectangular and has a central rectangular opening 11. For ease of description, the four sides of the rectangular frame are given separate reference characters. Thus the front portion (to the left as seen in Figures 1 and 2) is designated 12, the bottom 13, the right-hand side 14, and the top 15. This frame is milled to produce the cross-sectional shape indicated for the portions 12, 13, 14 and 15, by reference to Figures 3, 4, 2 and 4, respectively. Fixed in the left and right-hand lower solid portions of the frame members 12 and 13 respectively, are press fitted upwardly extending guide rods 16 and 17 respectively. These rods serve, as will appear hereinafter, to guide the movable elements including the gaging contacts in a straight line movement. The guiding may be extremely accurate because, as will hereinafter be seen, the reed suspension utilized produced straight line movement and there is therefore no tendency to bind against the rods as the movable element slides along the guide rods.

Mounted on the guide rods for vertical reciprocatory movement with respect to the frame 10 is a movable element 18. This element, as is clearly seen in Figures 4 and 5, is generally rectangular in cross section and is provided at its left hand and with an enlarged vertically extending portion 20 which carries a movable thread gaging contact 21 and also an anvil 22 which transmits the movement of element 18 to the measuring plunger 23 of a dial indicator gage 24.

The dial indicator gage 24 is, in the embodiment of the invention schown in Figures 1 through 5, provided with a dovetail spline 25 which is adapted to fit in a groove 26 in the upper frame member 15 and to be locked in position therein by means of the set screws 27.

The element 18 is guided, as has been described, but is supported by means of the reed structure now to be described. This reed structure consists of three reeds 28, 30 and 31. Reed 28 is clamped to one face of the movable element 18, the clamping being done by means of the bar 32 and screws 33, see Figures 2 and 4. At its opposite side, reed 28 is clamped by means of a similar bar 34 and screws 35 to a floating member 36. Reed 30 is clamped to the opposite face of the floating member 36 by means of a bar 37 which is held against the face of the floating member 36 by means of the same screws 35 which hold the bar 34 to the forward face. The opposite side of reed 30 is in turn clamped by means of a bar 38 to the rear face of a second floating member 40. In a similar manner the third reed 31 is clamped by means of the bar 41 and screws 42 to the forward face of the second floating member 40 while its lower side is clamped by means of a bar 43 and screws 44 to the forward face of the frame member 13.

As will be seen by comparing Figures 4 and 5, the reeds 28, 30 and 31 bend along a longitudinal line flexing throughout their width, but because of the strength across that width, do not bend downwardly at the forward or left end where the contact member 21 is supported. Consequently, the gage has extreme rigidity and can be utilized for gaging relatively deeply within the bore since the stability of the measurement will not be affected by any lack of rigidity in the measuring direction. Furthermore, due to the arrangement of utilizing a multiplicity of reeds fixed alternately to opposite sides of the floating members such as 36 and 40, the movement of the member 18 is substantially in a straight line resulting in a minimization of binding effect upon the guide rods 16 and 17.

As will be obvious, a fixed gaging contact 45 is provided, this contact in the embodiment shown in Figures 1 through 5 being the mating contact of the thread gaging pair 21, 45, and being fixed to the lower forward portion of the frame member 12.

As will be apparent in its normal position, the thread engaging contact 21 is separated from the contact 45 since the reeds 28, 30 and 31 tend to assume their straight position as shown in Figure 4. In order to utilize the gage it is of course essential that the members 21 and 45 be moved toward each other so that they may be inserted within the threaded bore to be gaged. In order to perform this retracting operation a trigger member 46 is pivoted to the frame base member 13 by means of the pivot pin 47. The forward extension of the trigger extends above a hook end 48 formed on a retracting wire 50 which wire extends upwardly through apertures drilled or otherwise formed in the base 13 and floating members 36 and 40 and is fixed by means of a set screw 51 in a small aperture in the movable gaging member 18.

The trigger 46 is placed forwardly (to the left as seen in Figure 2) of a handle 52, formed as a pistol grip, which handle is fixed to the lower rearward corner of the frame 10. Thus the trigger 46 is readily operated and when operated causes the thread measuring contacts 21 and 45 to come together or at least to approach each other effecting the flexing of the reeds 28, 30 and 31 to the position indicated in Figure 5. As will be seen when the trigger is released after the contacts have been inserted in a threaded bore the reeds will seek their normal position as shown in Figure 4 and the extent to which they are permitted to do so by the seating of the measuring contacts in the bore will be indicated by the dial indicator, the motion of the member 18 being transmitted to that indicator through the anvil 22 and indicator measuring plunger 23.

In order to assure that the measuring conatcts will seat completely in the threads of a bore, the pressure of the reeds 28, 30 and 31 is augmented by means of a leaf-spring 53, one end of which is placed in a notch 54 formed in the frame member 14 and the other end of which bears against the lower portion of the enlarged forward end 20 of the movable gaging member 18. The tension exerted by leaf-spring 53 can be adjusted by means of an adjusting screw 55, which is threaded into the base member 13 of the frame 10, and extends through a clearance hole in floating member 40.

In order to limit the retracting movement of the gaging member 18 and gaging contact 21 an adjustable stop screw 56 (Figure 2) is provided, this screw being threaded into member 18 and cooperating with the upper surface of the projection 57 of the side frame element 14. In a similar manner the upward motion of the movable elements is limited by a stop screw 49 (Figs. 1 and 2).

As shown particularly in Figures 1 and 2, a cover member 58 is provided which member extends in a curve about the upper rear portion of the frame member 14 enclosing the rear end of the gaging member 18 and the retraction limiting screw 56. The cover member extends forwardly on either side of the gage as is clearly shown in Figure 1 and terminates at point 60 thus serving to completely enclose the reed structure and prevent the accumulation of dust and dirt upon the reeds and also to prevent damage to the reeds which might be occasioned by striking them with objects adjacent the point of utilization of the gage.

The gaging contacts 21 and 45 are, in common fashion, formed with mounting members designated 61 and 62 respectively, integral therewith, the mounting members being fixed to the enlarged portion 20 of the movable member 18 and to the frame 10 respectively. Also, as is common, stop members 63 and 64 are provided, these members comprising right angled rods which are mounted in the mounting members 61 and 62 respectively. These stop members may be moved axially of the thread gage contacts 21 and 45 and serve to determine the extent to which the gaging contacts may penetrate into a bore, thus assuring that the thread is measured at the desired location.

Referring now to Figure 6, there is shown therein a modification of the gage heretofore described to adapt it to measurement of external dimensions such, for example, as an exterior groove in a cylindrical object as, for example, a shaft. In this instance, the side member 12 of the frame 10 is extended upwardly beyond the top of the movable gaging member 18 and a fixed contact member 65 is fixed thereto by means of the angle mounting member 66. In this case, the lower contact member 67 is fixed to the enlargement 20 of the movable frame member 18 and faces upwardly rather than downwardly. It will thus be seen that the contact members 65 and 67 are urged toward each other and that retraction separates the contacts rather than bringing them closer together. By means of this frame extension, therefore, the gage is readily adapted to the gaging of external dimensions.

Although, in connection with the prior drawings, a mode of mounting a "test indicator" was described, it is entirely possible to utilize an indicator of American gage design standard dimensions and adaptation for such a gage is illustrated in Figure 7. In this figure there is shown a split clamping member 68 having the usual aperture therethrough as indicated at 70. The stem 71 of an A.G.D. standard gage is inserted through the aperture 70, the gage then being clamped in position by tightening of the clamping screw 72. As is readily seen by reference to Figure 7, the clamping member 68 replaces the cover 73 of Figs. 1 and 2. Clamping member 68 is provided with an aperture therethrough in line with the anvil 22 and of course in line with the stem 71 of the gage 74. In the usual manner it is, of course, possible to rotate the stem 71 in its aperture 70 to thereby face the dial of the gage 74 in any desired direction.

In addition to the various advantages heretofore mentioned, it will be noted that the gage hereinabove described is extremely compact particularly in its dimension from side to side. It is thus usable in many situations where gages having wider cross section cannot be utilized as, for example, in measuring a groove in a radically reduced diameter portion of a large cylinder or shaft.

While I have described preferred embodiments of my invention, it will be understood that the construction may be modified in many ways without departing from the spirit of the invention. For example, although three reeds have been described, it is obvious that other numbers of reeds might be utilized depending primarily upon how great a range of retracting movement is desired. Of course, other structural modifications might also be made as has been indicated by illustration of the slight modification necessary to convert the gage from an internal to an external gage. I wish therefore to be limited not by the foregoing description but solely by the appended claims.

What is claimed is:

1. In a precision linear gage having a fixed gaging contact, an opposed movable gaging contact, and a dial indicator operated by the movable contact, the improvement which comprises a plurality of reeds lying in planes parallel to the direction of the gaging movement, and means connecting said reeds in a series arrangement between the fixed and movable gaging contacts.

2. A gage as claimed in claim 1, wherein one edge of a first reed of said plurality of reeds is fixed to the fixed gaging contact, one edge of the last reed of said plurality of reeds is fixed to the movable gaging contact and wherein floating members are provided, the respective opposite edges of said first and last reeds and a pair of opposite edges of other reeds of said plurality of reeds being fixed to said floating members, each said floating member being fixed to adjacent edges of successive reeds.

3. A gage as claimed in claim 2, wherein said floating members extend in planes perpendicular to the planes of the reeds and said reeds are attached to said floating members on opposite sides thereof.

4. A gage as claimed in claim 3, characterized in that guide members are associated with the fixed gaging contact, and means associated with the movable gaging contact engage said guide members and permit movement of said movable contact along a straight line only.

5. A precision linear gage, comprising, in combination, a generally rectangular frame, a gaging contact fixed to one side of said frame, guide rods fixed to said frame, said rods extending parallel to said side to which said contact is fixed, a movable member, means on said member cooperating with said rods for guiding said member for reciprocatory movement relative to said frame and in a direction parallel to said side, a plurality of long narrow reeds interconnecting said frame and said movable member, said reeds lying in planes parallel to the direction of reciprocatory movement, one of said reeds being fixed along one long edge thereof to the base of said frame with the long edges of said reed perpendicular to the direction of movement of said movable member, another of said reeds being fixed along one of its long edges to said movable member, and means interconnecting the remaining long edges of said reeds.

6. A gage in accordance with claim 9 wherein the means interconnecting the long edges of said reeds comprises floating members attached to adjacent edges of successive reeds and additional reeds interconnecting said floating members.

7. A gage as claimed in claim 1, wherein said reeds lie in planes defined by mutually perpendicular axes, one of said axes of each reed extending in the direction of gaging movement, the movable contact being connected to the last of said series of reeds and the fixed contact to the first of said series of said reeds and wherein retracting means are provided to move the movable contact relative to the fixed contact, the said retracting means extending from means fixed to the fixed contact to means fixed to the movable contact whereby said reeds may be flexed about the other of said mutually perpendicular axes to retract the movable contact to permit positioning of a workpiece between the gaging contacts.

8. In a precision linear gage, in combination, a frame, a gaging contact fixed to said frame, a movable gaging member mounted on said frame for reciprocatory movement with respect thereto, a movable gaging contact fixed to said member, a plurality of reeds lying in planes parallel to the direction of said reciprocatory movement, said planes being defined by mutually perpendicular axes, one of said axes of each reed being parallel to the direction of reciprocatory movement and means connecting said reeds in series between said frame and said member, each said reed being flexed about the other of said mutually perpendicular axes as the gaging contacts are relatively moved from a gaging to a retracted position.

9. In a precision linear gage, in combination, a frame, a gaging contact fixed to said frame, a movable gaging member mounted on said frame for reciprocatory movement with respect thereto, a movable gaging contact fixed to said member, a plurality of reeds lying in planes parallel to the direction of said reciprocatory movement, said planes being defined by mutually perpendicular axes, one of said axes of each reed being parallel to the direction of reciprocatory movement, means connecting said reeds in series between said frame and said member, each said reed being flexed about the other of said mutually perpendicular axes as the gaging contacts are relatively moved from a gaging to a retracted position, a dial indicator mounted on said frame and means on said movable member for operating said dial indicator.

10. In a precision linear gage, in combination, a frame, a gaging contact fixed to said frame, a movable gaging member mounted on said frame for reciprocatory movement with respect thereto, a movable gaging contact fixed to said member, a plurality of reeds lying in planes parallel to the direction of said reciprocatory movement, said planes being defined by mutually perpendicular axes, one of said axes of each reed being parallel to the direction of reciprocatory movement, means connecting said reeds in series between said frame and said member, each said reed being flexed about the other of said mutually perpendicular axes as the gaging contacts are relatively moved from a gaging to a retracted position, a dial indicator mounted on said frame, said dial indicator having a measuring plunger, and means adjustably fixed to said movable member and making contact with said measuring plunger for operating said dial indicator.

References Cited in the file of this patent

UNITED STATES PATENTS

| | | |
|---|---|---|
| 2,561,534 | Parker et al. | July 24, 1951 |
| 2,581,264 | Levesque | Jan. 1, 1952 |
| 2,772,481 | Grobet | Dec. 4, 1956 |